June 7, 1966  A. CRAWFORD  3,254,911
HIGH SPEED PRECISION KNOTTER

Filed Nov. 16, 1964  8 Sheets-Sheet 1

Inventor
ALEXANDER CRAWFORD

By Tweedale & Gerhardt
Attorneys.

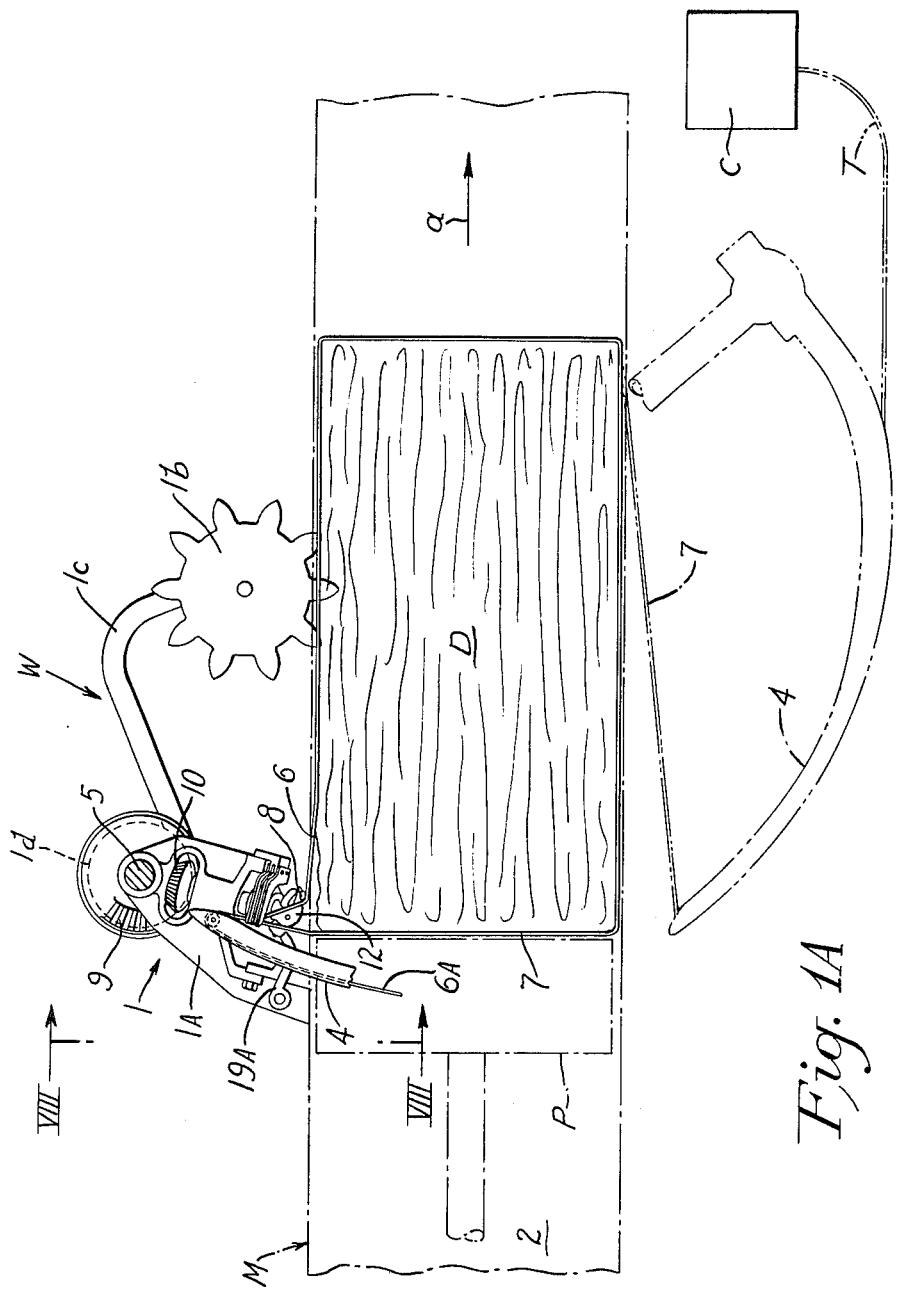

June 7, 1966   A. CRAWFORD   3,254,911
HIGH SPEED PRECISION KNOTTER
Filed Nov. 16, 1964   8 Sheets-Sheet 7
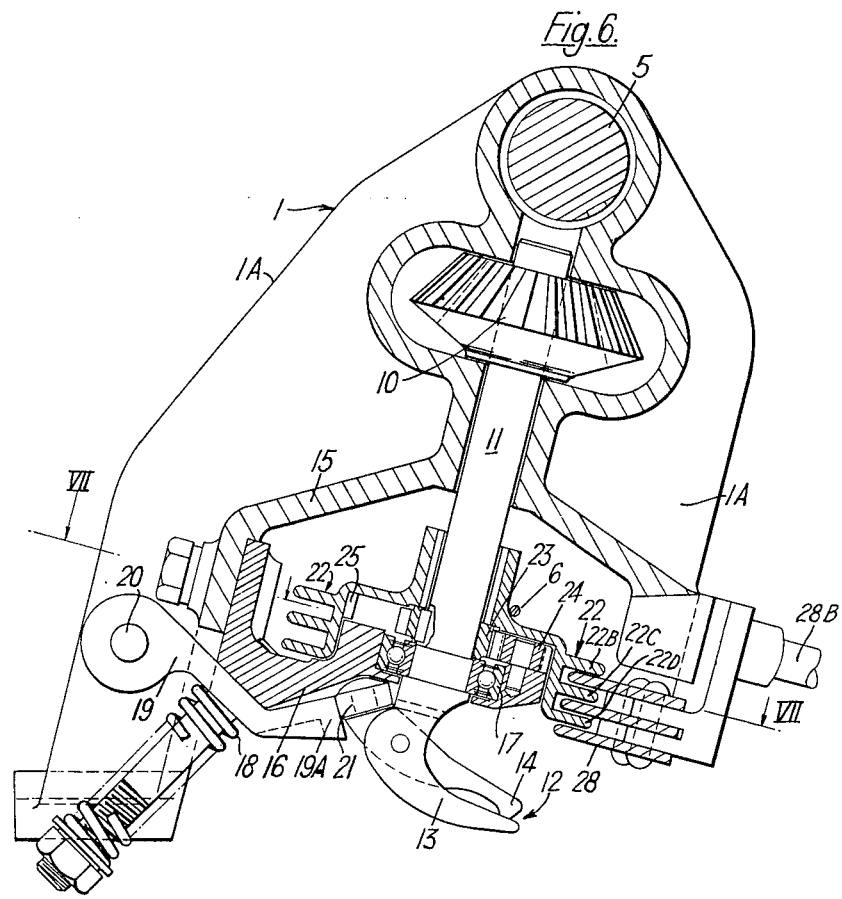
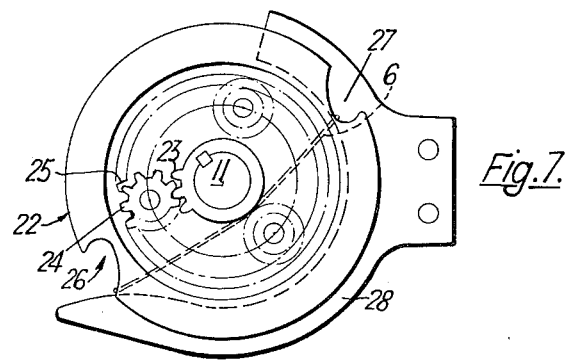
Inventor
ALEXANDER CRAWFORD
By Tweedale & Gerhardt
Attorneys.

June 7, 1966 A. CRAWFORD 3,254,911
HIGH SPEED PRECISION KNOTTER
Filed Nov. 16, 1964 8 Sheets-Sheet 8
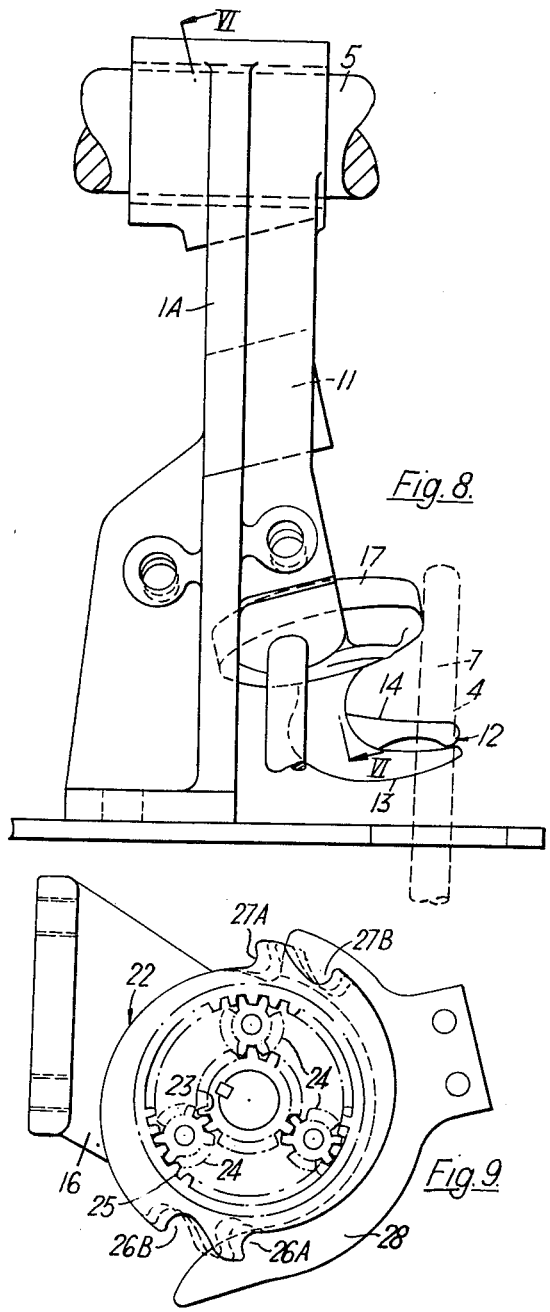
Inventor
ALEXANDER CRAWFORD
By Tweedale & Gerhardt
Attorneys.

United States Patent Office 3,254,911
Patented June 7, 1966

3,254,911
HIGH SPEED PRECISION KNOTTER
Alexander Crawford, Warwick, England, assignor to Massey-Ferguson Services N.V., Curacao, Netherlands Antilles
Filed Nov. 16, 1964, Ser. No. 411,536
Claims priority, application Great Britain, Nov. 19, 1963, 45,529/63
15 Claims. (Cl. 289—13)

This invention relates generally to baling machines, and more particularly to tying or knotting mechanisms for tying bales or sheaves of crop material such as hay and straw as the bales are formed in the baling machine.

In conventional baling machines, hay, straw and similar crop material that has been previously cut, windrowed or swathed, is picked up from the ground by a pick-up unit and fed in successive batches or charges into an elongate baling chamber in timed sequence with a reciprocating plunger. The plunger compresses the material into bales, and at the same time, gradually advances the bales toward the outlet of the baling chamber. As the bales reach a predetermined length as determined by a metering device, a tying mechanism is actuated which wraps cord, twine or other flexible tie material around the bale and secures the ends of the tie material together.

At present, such machines are capable of efficient operation at speeds up to a maximum of approximately eighty strokes of the baling plunger per minute. One reason for this limitation on the operating speed is that presently available knotting mechanisms cannot perform the complex twisting and tying operation at faster speeds, since the latter operation must be carried out in timed sequence with the strokes of the baling plunger.

In the usual arrangement, the input shaft of the knotting mechanism must complete one revolution for each stroke of the plunger, during which revolution, the entire knotting or tying operation must be completed. In general, the tying operation includes wrapping the bale with cord by an oscillating needle which brings the two ends of the cord together at a rotary, cord-retaining disc, and thereafter rotating a bill hook to gather the end strands of the cord together and tie them together. During this cycle of operation, a twine finger must operate to place the cord ends in proper position to be engaged by the bill hook, and a stripping finger operates to remove the tied ends from the bill hook upon completion of its rotation.

Consequently, in the typical knotting mechanism, the bill hook must complete its operation of one revolution during only about one-fifth of each revolution of the input shaft. Thus, with a plunger speed of eighty strokes per minute, the bill hook must complete its revolution in approximately three-twentieths of a second. To increase the speed of the baling machine would require the bill hook to rotate even faster than three-twentieths of a second which would be too fast to carry out the knotting operation.

It is therefore an object of this invention to provide a knotting mechanism for baling machines in which the bill hook is actuated earlier in the tying cycle so as to utilize a larger fraction of the plunger cycle for completing the twisting and knotting operation.

A further object is to provide a knotting mechanism for baling machines in which the speed of the bill hook is substantially reduced with respect to the speed of the baling plunger thereby permitting the plunger speed to be increased.

Still another object lies in the provision of a simplified, more efficient knotting mechanism for baling machines having a rotatable bill hook and card retaining disc in which the usual twine finger and stripping finger for respectively introducing and removing the tie material from the mechanism is eliminated.

In achievement of the foregoing, and other objects, the knotting mechanism according to the present invention includes a rotatable bill hook having a shaft on which is rotatably mounted a cord retaining disc. The cord disc is drivingly connected with the bill hook shaft in such a manner that it rotates in the opposite direction to the bill hook shaft and at a speed approximately one-half of the speed of the bill hook shaft. The bill hook shaft in turn is drivingly connected to the input shaft by a gear segment in such a manner that the bill hook shaft rotates one revolution for each one-half of a revolution of the input shaft.

The mechanism is arranged on the baling chamber such that the rotary axis of the bill hook and cord disc is inclined in such a manner that the bill hook projects downwardly and rearwardly so that the knot formed thereby can be stripped from the bill hook more easily, and so that the cord disc is disposed to more easily grip the ends of the tie material.

Other objects, advantages and features of the invention will become apparent from the following description taken in connection with the accompanying drawings in which:

FIG. 1A is a schematic elevational view of a portion of a typical baling machine having a knotting mechanism embodying the invention mounted thereon;

FIG. 6 is a diagrammatic sectional view corresponding to FIGS. 1–5 to an enlarged scale taken on line 6—6 of FIG. 8;

FIG. 7 is a sectional view taken on line 7—7 of FIG. 6;

FIG. 8 is an end view of the knotting mechanism with parts omitted or shown diagrammatically for clarity; and FIG. 9 is a plan view corresponding to FIG. 7 showing a modification.

Figure 1:
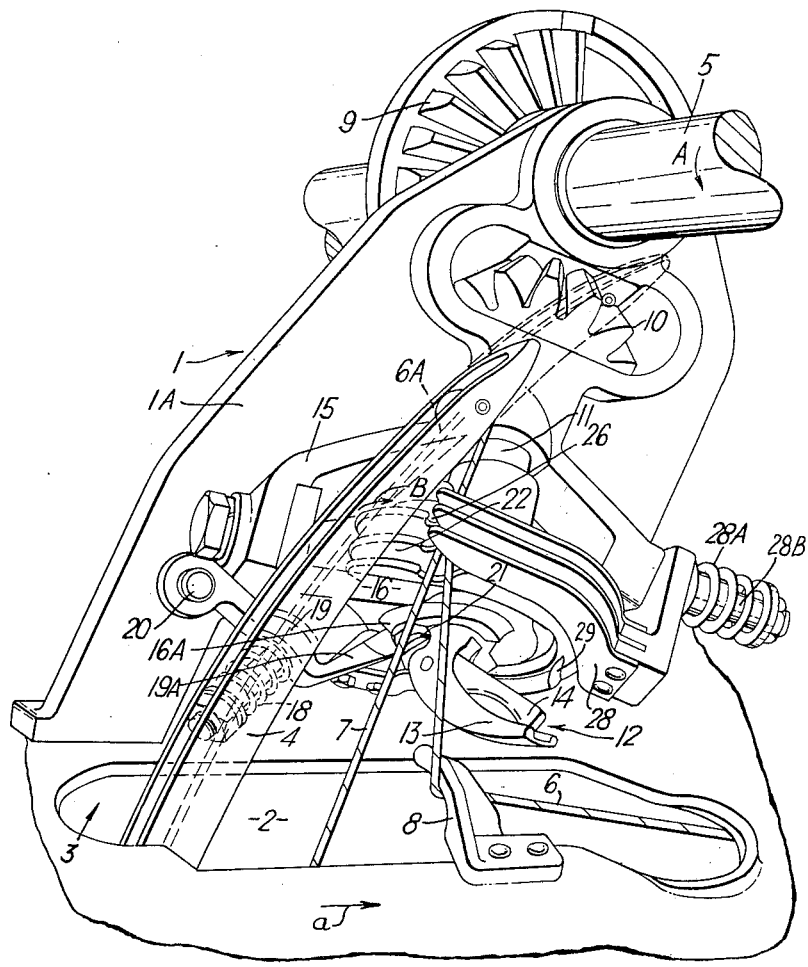
FIGS. 1–5 are perspective views of a knotting mechanism according to the present invention illustrating the sequence of operation thereof.

While a specific embodiment of the invention will be described in the foregoing specification, it should be understood that I do not intend to limit the invention to the exact construction shown. On the contrary, I intend to cover all alternatives, modifications and equivalents falling within the scope and spirit of the invention.

A typical baling machine M is partially shown in FIG. 1A and includes a baling chamber 2. As cut crop material is picked up from the ground, it is fed in successive batches or charges into the inlet of the baling chamber, and the batches of material are compressed into bales by a reciprocating plunger P, which also advances the bales along the chamber toward the outlet in the direction of arrow $a$.

A primary portion or length 6 of cord or flexible tie material T extends across the baling chamber in the path of the leading end of each bale from a supply reel or container C and passes around a needle 4 with the end of the cord being supported on a tying or knotting mechanism 1 mounted on the outer top wall of the baling chamber. The knotting mechanism 1 includes an input shaft 5 rotatably journalled in the support frame 1A of the knotting mechanism which is intermittently actuated by a conventional trip mechanism W which may, for example, be of the type shown in U.S. Patent 2,647,355.

Trip mechanism W includes a toothed metering wheel 1b which is caused to engage the packed hay and turn about its shaft as the bale moves along chamber 2. A cam on the shaft of wheel 1b operates a trip lever 1c connected to a clutch mechanism 1d. The diameter of wheel 1b is such that when the bale is formed into a suitable length, the cam on the shaft of wheel 1b causes trip lever 1c to actuate the input shaft 5 of the knotting mechanism through clutch mechanism 1d to initiate the tying cycle.

Upon actuation of input shaft 5, a needle 4, driven by input shaft 5, moves from its dwell or at rest position indicated by phantom lines in FIG. 1A to its full throw position shown in full lines in FIG. 1A to wrap cord T around the bottom and trailing end of the bale D and place the secondary end portion 7 of cord T in the knotting mechanism 1. Cord T loops back over needle 4 in the full throw position leaving a primary portion or length 6A of cord T across the path of the succeeding bale to be formed. As the needle returns to its dwell position, the ends of primary and secondary portions 6 and 7 are twisted and tied together by the knotting mechanism with secondary portion 7 being severed from the supply cord T during the tying operation.

In FIG. 1, the top wall of the baling chamber is formed with an aperture 3, and a cord retaining bracket 8 is mounted on the wall of the chamber and projects over the aperture. The knotting mechanism 1 includes a support base or frame 1A mounted on the baling chamber wall adjacent aperture 3 on the opposite side thereof from bracket 8. Support frame 1A is formed with a cylindrical bearing sleeve at its upper edge in which input shaft 5 is rotatably journalled.

Mounted on input shaft 5 is a gear segment 9 formed with beveled teeth over substantially one-half of its circumference, i.e., the teeth extend through an angle of substantially 180 degrees. Gear segment 9 intermittently meshes with a gear wheel 10 mounted on the upper end of a twister shaft 11. Mounted on the lower end of shaft 11 is a bill hook 12 having a fixed jaw 13 and a pivotal jaw 14.

Bill hook or twister shaft 11 is rotatably received in a yoke 15 formed on support frame 1A, and a bearing support member 16 is secured to the lower end of yoke 15 by conventional bolts. A bearing 17 is received in support 16 (FIG. 6) for rotatably supporting bill hook shaft 11. Formed on the lower side of support 16 is a cam face or track 16A (FIGS. 1-5) engageable by a roller 21 carried by the tail portion of the pivotal jaw 14 of the bill hook. As the bill hook rotates about the axis of shaft 11, roller 21 engages cam track 16A which causes jaw 14 to pivot about its connection with the fixed jaw 13 to an open position, as shown in FIG. 4.

Pivotally mounted on support frame 1A by a pin 20 is a cam lever 19 having a cam surface formed on its free end 19A. Lever 19 is biased upwardly against a boss formed on the lower side of support 16 by a spring 18. Spring 18 is supported on a threaded rod carried by support 16 and extending through spring 18 and an opening in lever 19 (FIG. 6). When roller 21 is carried into engagement with the free end 19A of lever 19, paw 14 moves from its open position to its closed position against the fixed jaw 13 as shown in FIG. 6.

Rotatably mounted on shaft 11 within yoke 15 (FIG. 6) is a cord retaining disc 22 in the form of an inverted cup shaped member having three spaced peripheral flanges 22B, 22C and 22D. As shown in FIGS. 6 and 7, a sun gear wheel 23 is fixed to shaft 11 and is enclosed by cord disc 22. Sun wheel 23 meshes with planet gear wheels 24 carried by support 16, and planet wheels 24 in turn mesh with a toothed annulus or ring gear 25 formed on the inner periphery of cord disc 22. The gearing is such that cord disc 22 is driven by shaft 11 of bill hook 12 at one-half the speed of shaft 11 and in the opposite direction. It will be noted that yoke 15 and support 16 enclose and shield the gears from the entry of dirt and dust.

Figure 5:
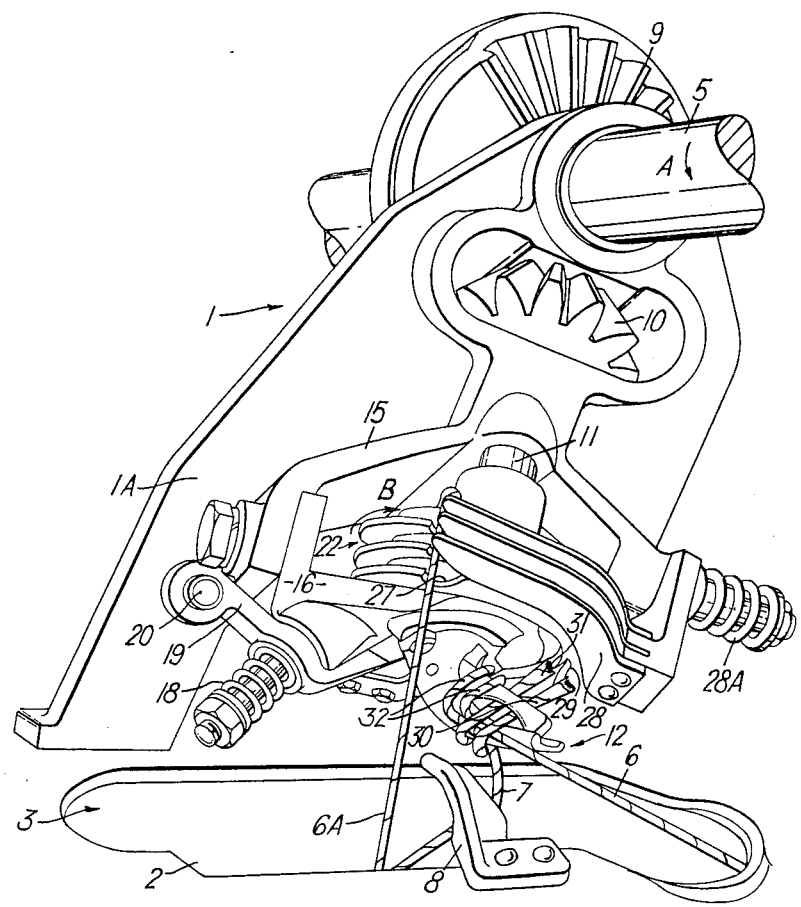

Formed by aligned notches in flanges 22B, C and D of cord disc 22 are diametrically spaced grooves 26 and 27 as shown in FIGS. 5 and 7. Support 16 carries three retainer fingers 28 mounted on a rod 28B and resiliently urged by spring 28A concentrically mounted on rod 28B to project between the flanges 22B, C and D of cord disc 22. The tension in spring 28A is adjustable to provide for adjustment of the cord tension. Projecting from the lower face of support member 16 is a knife blade 29 (FIGS. 1 and 5).

Bill hook 12 is inclined rearwardly and downwardly as shown in FIGS. 1 and 5 and projects in a fore-and-aft direction. With reference to FIG. 8, bill hook shaft 11 is inclined at an angle, preferably of approximately 15 degrees, to the left of the vertical as viewed from the front of the machine. The effect of inclining shaft 11 is that the needle 4, shown in dotted outline in FIG. 8, may place the end of cord portion 7 in a position such that it is within reach of bill hook 12. Since the bracket 8 also is positioned to hold the cord end 6 within reach of the bill hook, no twine finger is required.

In addition, it is desirable to incline the knotter bill hook shaft 11 in the fore-and-aft direction at an angle to the vertical, which may lie advantageously between 15 and 30 degrees. The purpose of inclining the bill hook shaft in the foregoing manner is to insure that cord 7, when placed in cord disc 22, lies approximately parallel to bill hook shaft 11 so that the bill hook 12 engages the cord at approximately a right angle. Secondly, this angle has the effect of inclining the bill hook jaws downwardly when in the stripping position of FIG. 5 so that the knot may easily be pulled off the jaws in a manner to be set forth below.

The sequence of operation of the mechanism can best be understood with reference to FIGS. 1A and 1-5. Upon actuation of clutch 1d by the metering mechanism 1b and c, the drive to input shaft 5 engages when the baling plunger is substantially at the end of a working stroke. During the initial rotation of input shaft 5, gear segment 9 is not in mesh with gear wheel 10. The initial rotation of shaft 5 actuates needle 4 to bring it from the dwell position shown in broken lines in FIG. 1A to the full throw or full line position of FIG. 1A, and the position shown in FIG. 1. Needle 4 moves upwardly through the baling chamber and through slots in the baling plunger to the full throw position.

In FIG. 1, the end of the length of cord engaged by the leading end of the bale is indicated by reference numeral 6 and is referred to as the primary end portion of the cord. Primary end portion 6 is received in groove 26 of the cord disc 22 and passes across the top of disc 22 and down into groove 27 diametrically on the opposite side of disc 22 and firmly held in position by the retainer fingers 28.

Needle 4 carries the end of the secondary portion 7 of the cord from the position shown in broken lines in FIG. 1A around the bottom and trailing end of the bale to the position shown in FIG. 1 and places it in groove 26 adjacent the primary end portion 6. Bracket 8 serves to hold the primary end portion 6 in its correct position as the bale advances through chamber 2. Lever 19 is biased by spring 18 to act against roller 21 on bill hook jaw 14 and hold it closed against the lower jaw or hook 13.

During this initial rotation of input shaft 5, gear wheel 10 is not in engagement with the teeth of gear segment 9, and consequently the bill hook shaft 11 as well as cord disc 22 remain idle during the time that needle 4 places cord portion 7 in engagement with the cord disc. As needle 4 returns to the dwell position, the teeth of gear segment 9 engage with gear wheel 10 causing shaft 11 to rotate in a clockwise direction as viewed from the top in FIGS. 1-5, which in turn causes cord disc 22 to rotate in the opposite direction as indicated by arrow B in FIGS. 1 and 2. Cord disc 22 rotates in the opposite direction to shaft 11 at one-half speed of shaft 11 and bill hook 12 in the illustrated embodiment. When the needle 4 retracts, it leaves secondary end portion 7 located in groove 26 and held by retainer finger 28. Cord T lopps from the end of secondary portion 7 and passes through the bale chamber to form the primary cord portion 6A for the succeeding bale.

As cord disc 22 rotates in the direction of arrow B, grooves 26 carry secondary end portion 7 around the periphery of the cord disc and the end portion 6A extends over the upper edge of groove 26 and rests against the outer periphery of the flanges of the cord disc. When the cord disc rotates through an angle of 180 degrees, grooves 27 will engage portion 6A of the cord which will extend across the top of the cord disc as shown in FIG. 7 with its end retained in grooves 26 by fingers 27.

Figure 2:
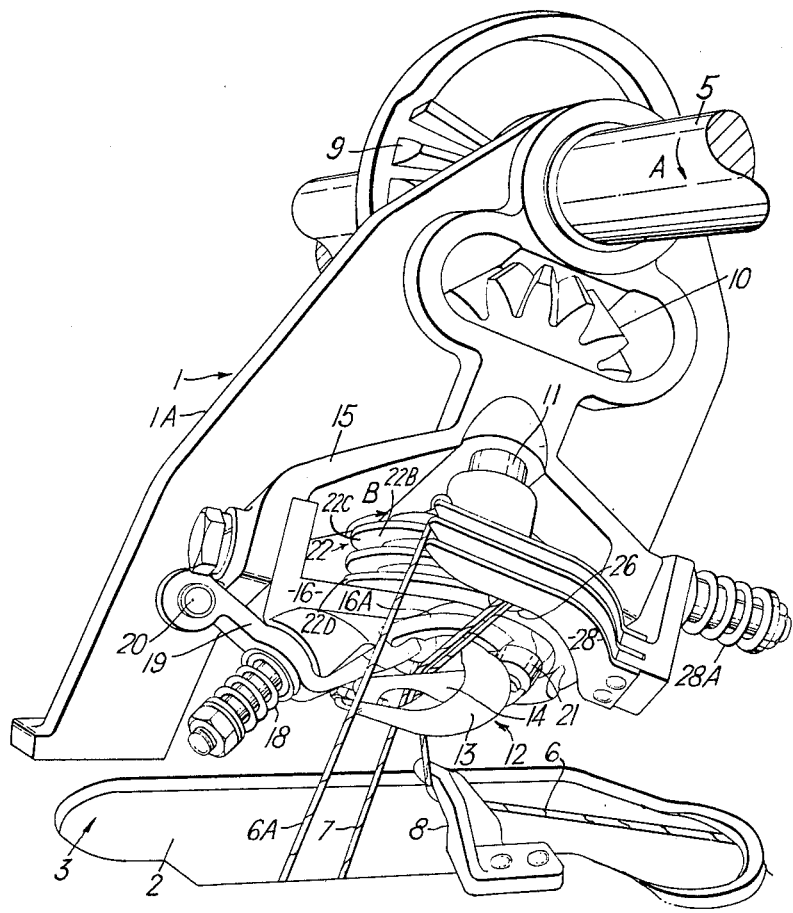

Needle 4 retracts in timed sequence with rotation of the bill hook such that the portion 6A of the cord is shielded from the bill hook by the needle until it rotates past the needle as shown in FIG. 2. In FIG. 2, bill hook 12 has rotated from its starting position through an angle of slightly more than 180 degrees to move the ends of the bill hook jaws past cord portion 6A and bring roller 21 into engagement with cam track 16A.

Figure 3:
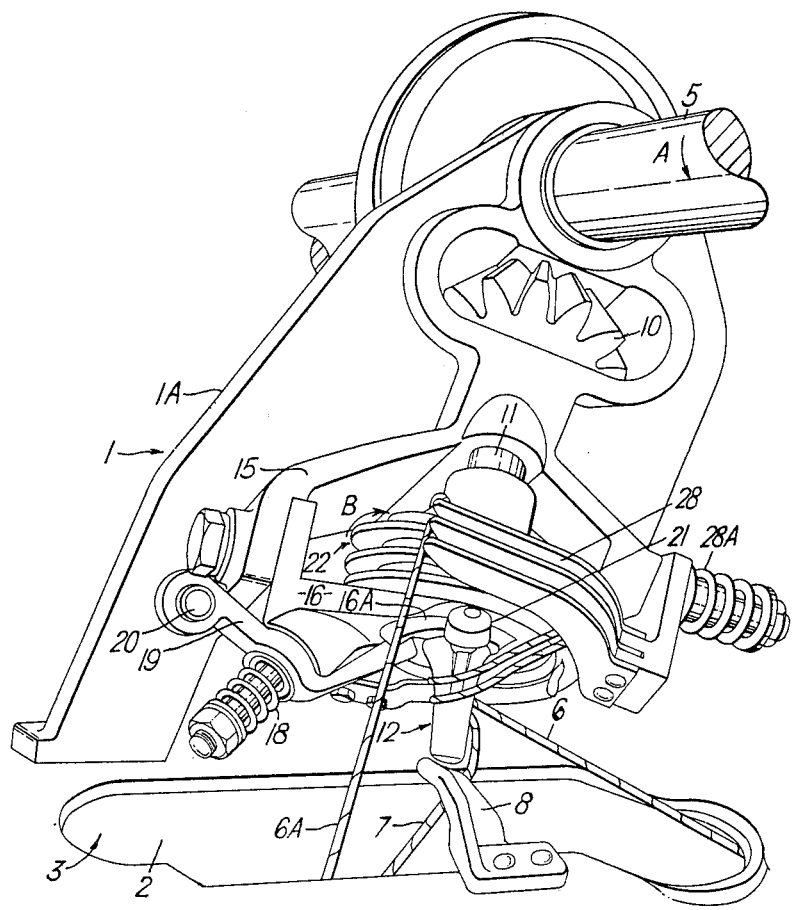
Figure 4:
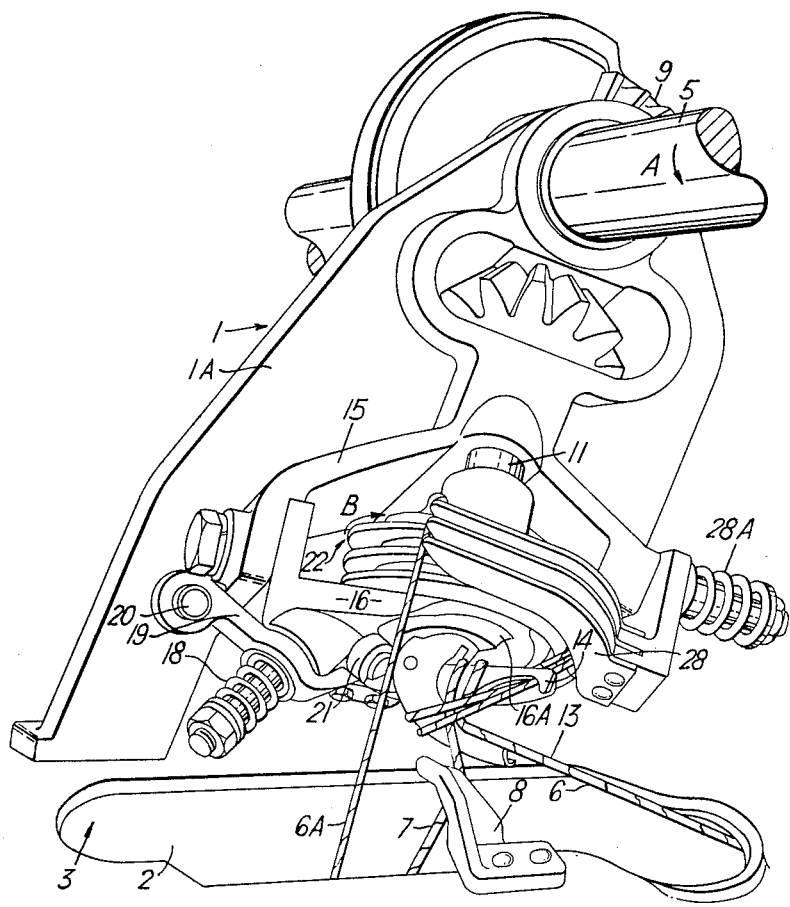

In FIG. 3, the bill hook has rotated further to strip primary end portion 6 off of bracket 8, and roller 21 moves along cam track 16A to begin opening movement of jaws 13 and 14 of the bill hook. In FIG. 4, roller 21 has advanced along cam track 16A to a position in which the bill hook jaws are fully opened by roller 21, and the cord disc has moved the cord end portions 6 and 7 to a position in which they are received between the open jaws of the bill hook.

Continued rotation of bill hook 12 from the position of FIG. 4 causes roller 21 to engage the end of lever 19 to close the bill hook jaws. As the bill hook rotates to the position shown in FIG. 5, end portions 6 and 7 are severed from the cord supply by knife 29. Bill hook 12 comes to rest in the position shown in FIG. 5 with the jaws 13 and 14 facing rearwardly and downwardly so that on the next stroke of the baling plunger, cord portions 6 and 7 are moved rearwardly to strip the severed ends from jaws 13 and pass the cord ends 30 and 31 through the looped portions 32 of portions 6 and 7 of the cord to form a knot. Cord disc 22 has completed its cycle of one-half of a revolution and portion 6A of the cord is now positioned in groove 27 in the disc 22 and lies across the top of the cord disc and is anchored in groove 26 on the opposite side thereof. Groove 27 is now in the starting position formerly occupied by groove 26 in FIG. 1, and groove 26 is in the position formerly occupied by groove 27 in FIG. 1.

In typical prior art knotting mechanisms, a twine finger is required to place the cords in the correct position to engage the bill hook, and a stripping finger or the like is required to pull the cut cord ends out of the jaws. In the present arrangement, however, the twine finger and stripper are not necessary due to the concentric arrangement of the cord disc 22 and bill hook shaft.

With the elimination of the twine finger or stripper, the portion of the operating cycle in which they are normally operated is eliminated and may be utilized to increase the proportion of the cycle during which the bill hook is driven. Moreover, only the one gear segment 9 is necessary which further simplifies the construction and manufacture of the mechanism.

Since the bill hook rotates more slowly than in prior art mechanism, the baler can be operated at much higher speeds than was heretofore possible without detriment to the efficiency of the knotting mechanism. Thus, in the present invention, assuming an input shaft speed of eighty revolutions per minute (eighty plunger strokes per minute), the bill hook completes one revolution in one-half revolution of the input shaft, that is in three-eighths of a second as compared to three-twentieths of a second in conventional machines as mentioned above. In order for the bill hook in the present invention to operate at a speed of three-twentieths of a second as in the prior art machines described above, the baling plunger may operate with a stroke two and one-half times faster, that is at 200 strokes per minute. Thus, by virtue of the use of a larger fraction of the time during which the input shaft rotates for turning the bill hook through one complete revolution, the knotting mechanism of the present invention enables the baler to be operated at much higher speed than has heretofore been possible.

Obviously, the knotter may be operated at the slower speeds at presently normally used when it will be more efficient due to the longer time available to the bill hook for completion of its cycle. It should also be understood that a larger or smaller gear segment 9 may be utilized, but in order to obtain the benefit of high baling speeds a segment extending over an angle of approximately 180 degrees is preferred.

In the modification shown in FIG. 9, grooves 26 and 27 of the cord disc are replaced by a pair of side by side grooves 26A, 26B and 27A, 27B, respectively. In order to facilitate entry of the cord into the grooves, the grooves are inclined relative to the axis of shaft 11 so as to be substantially parallel to the cord as the cord is fed into the grooves. This may be achieved by staggering the notches in the flanges 22B, C and D which together form the notch 26A. In a similar manner, the notches in each of the groups of notches which form notches 26B, 27A and 27B are staggered as shown in FIG. 9. The advantages of the foregoing arrangement are that while the bale is being made the cord is held in two grooves, thus holding it more firmly and lessening the retainer pressure necessary. Furthermore, no loose ends are left since only one cord is cut in each cycle, and the free end of the other cord portion is pulled off as a tag end to the knot.

While a specific embodiment of the invention has been illustrated and described, it will be apparent to those skilled in the art that various alterations and modifications in the construction and arrangement of parts can be made without departing from the scope and spirit of the invention.

I claim:

1. A knotting mechanism for a baling machine including: a rotatable input shaft; a twister shaft; coacting drive means on said input and twister shafts operable to disconnect said twister shaft from said input shaft during a portion of each revolution of said input shaft and to rotate said twister shaft through one revolution during the remaining portion of the input shaft revolution; a retaining member operable to hold a pair of end strands of flexible tie material; means drivingly connecting said retaining member with said twister shaft for rotating said retaining member about the axis of said twister shaft at a slower speed than said twister shaft; and a bill hook carried by said twister shaft operable during rotation of said twister shaft and retaining member to twist and tie the end strands together.

2. A knotting mechanism as defined in claim 1 wherein said twister shaft is in engagement with said input shaft during substantially one-half of each input shaft revolution, and wherein said retaining member rotates about the axis of said twister shaft in the opposite direction to said twister shaft through an angle of substantially 180 degrees for each revolution of said twister shaft.

3. A knotting mechanism as defined in claim 2 wherein said retaining member comprises an inverted cup-shaped disc concentrically mounted on said twister shaft, and said means drivingly connecting said retaining member with said twister shaft includes a sun gear wheel fixed to said twister shaft, at least one planet gear wheel engaged with said sun gear wheel, and an internal, peripheral ring gear on said inverted, cup-shaped disc engaged with said planet wheel.

4. A knotting mechanism as defined in claim 3 further including a plurality of vertically spaced, radial flanges on said cup-shaped disc, and at least one pair of diametrically opposed grooves formed by aligned notches in said flanges for receiving said pair of end strands.

5. A knotting mechanism as defined in claim 3 further including a plurality of vertically spaced, radial flanges on said cup-shaped disc; and two pairs of side-by-side grooves formed by notches in said flanges; one of said pairs of grooves being spaced diametrically on the opposite side of said disc from the other, and said notches being staggered such that the axes of said grooves are inclined with respect to the axis of said twister shaft.

6. Knotting mechanism for a baling machine comprising: a support frame; a twister shaft rotatably mounted on said support frame; retaining means operable to hold the end portions of a length of flexible tie material in substantially parallel, side-by-side relationship; coacting drive means between said retaining means and said twister shaft operable to rotate said retaining means about the axis of said twister shaft in response to rotation of said twister shaft; and a bill hook in said twister shaft operable during rotation of said twister shaft and retaining member to twist and form a knot in the end portions of the tie material.

7. The construction defined in claim 6 wherein said coacting drive means comprises gearing operable to rotate said retaining means about the axis of said twister shaft in the opposite direction of rotation of the twister shaft and at a slower speed than that of the twister shaft.

8. The construction defined in claim 7 wherein said retaining means is in the form of an inverted cup-shaped member concentrically received on said twister shaft; and wherein said gearing comprises a sun gear fixed to said twister shaft, at least one planet gear rotatably mounted on said support frame and engaged with said sun gear, and a ring gear fixed to the inner periphery of said cup-shaped member and engaged with said planet gear; said gearing being operable to rotate said cup-shaped member one-half of a revolution during each revolution of the twister shaft.

9. The construction defined in claim 8 further including a plurality of vertically spaced, peripheral flanges on said cup-shaped member; a pair of diametrically opposed grooves formed by aligned notches in said peripheral flanges; and retainer fingers carried by said support and biased to project between said flanges and retain the end portions of the tie material in said grooves.

10. The construction defined in claim 9 further including an input shaft rotatably mounted on said support; and coacting gear means between said input shaft and said twister shaft operable to disconnect said twister shaft from said input shaft during substantially one-half of each revolution of said input shaft, and operable to rotate said twister shaft through one revolution during the remaining half of the input shaft revolution.

11. Knotting mechanism as claimed in claim 10, in which said grooves are inclined with respect to the axis of the bill hook shaft.

12. In a baling machine having a baling chamber having an aperture formed in the top wall thereof and means for forming crop material into successive bales of predetermined length and advancing the bales along the baling chamber; a support frame mounted on said wall adjacent the aperture; a twister shaft rotatably mounted on said support frame and extending generally upwardly from the top wall of the baling chamber; a bill hook on the lower end of said twister shaft; a length of flexible tie material having a primary portion and a secondary portion; retaining means mounted on said support frame for supporting the primary portion of said tie material across the baling chamber in the path of the leading end of the bale being formed therein such that the tie material is laid out along the top, leading end and bottom of the bale as the bale advances along the baling chamber during its formation; means for wrapping the secondary portion of said length of tie material around the trailing end of the bale when the bale is formed into its predetermined length and positioning the end thereof on said retaining member adjacent the end of said primary portion to be held by said retaining member; means for rotating said twister shaft one revolution from a starting position in which the bill hook projects rearwardly, means simultaneously rotating said retaining means about the axis of said twister shaft, said bill hook engaging said adjacent end portions at substantially a right angle during its rotation and cooperating with said retaining member to twist and form loops in said end portions; the subsequent advancement of said bale pulling the ends of said portions through said loop to form a knot therein as the tie portions are stripped from said bill hook.

13. The construction defined in claim 12 in which the upper end of the twister shaft projects rearwardly with respect to the longitudinal axis of the baling chamber such that the bill hook projects rearwardly and downwardly in its starting and stopping position such that the looped end portions are pulled downwardly and rearwardly from the bill hook upon subsequent advancement of the bale.

14. The construction defined in claim 13 wherein said retaining member comprises an inverted, cup-shaped member concentrically mounted on said twister shaft having diametrically opposed grooves formed thereon for alternately receiving the end portions of the tie material, and wherein said means for simultaneously rotating said retaining means about the axis of said twister shaft comprises gearing between said cup-shaped member and the twister shaft operable to rotate the cup-shaped member through 180 degrees in the opposite direction to the twister shaft for each revolution of the twister shaft, and further including a cord bracket mounted on the top wall of the baling chamber on the opposite side of said aperture from said knotting mechanism, said bracket projecting across said aperture for supporting the primary portion of the tie material as the bale is being formed.

15. The construction defined in claim 14 wherein said twister shaft is inclined laterally outwardly from said aperture in such a manner that the bill hook engages the end portions of the tie material at substantially a right angle.

References Cited by the Examiner

UNITED STATES PATENTS

| 1,100,906 | 6/1914 | Pearson et al. | 100—21 |
| 2,405,688 | 8/1946 | Crumb | 100—22 X |
| 2,823,059 | 2/1958 | Smith | 289—10 |
| 3,108,832 | 10/1963 | Harper | 289—13 X |

WALTER A. SCHEEL, *Primary Examiner.*

LOUIS O. MAASSEL, *Examiner.*